United States Patent Office 3,427,930
Patented Feb. 18, 1969

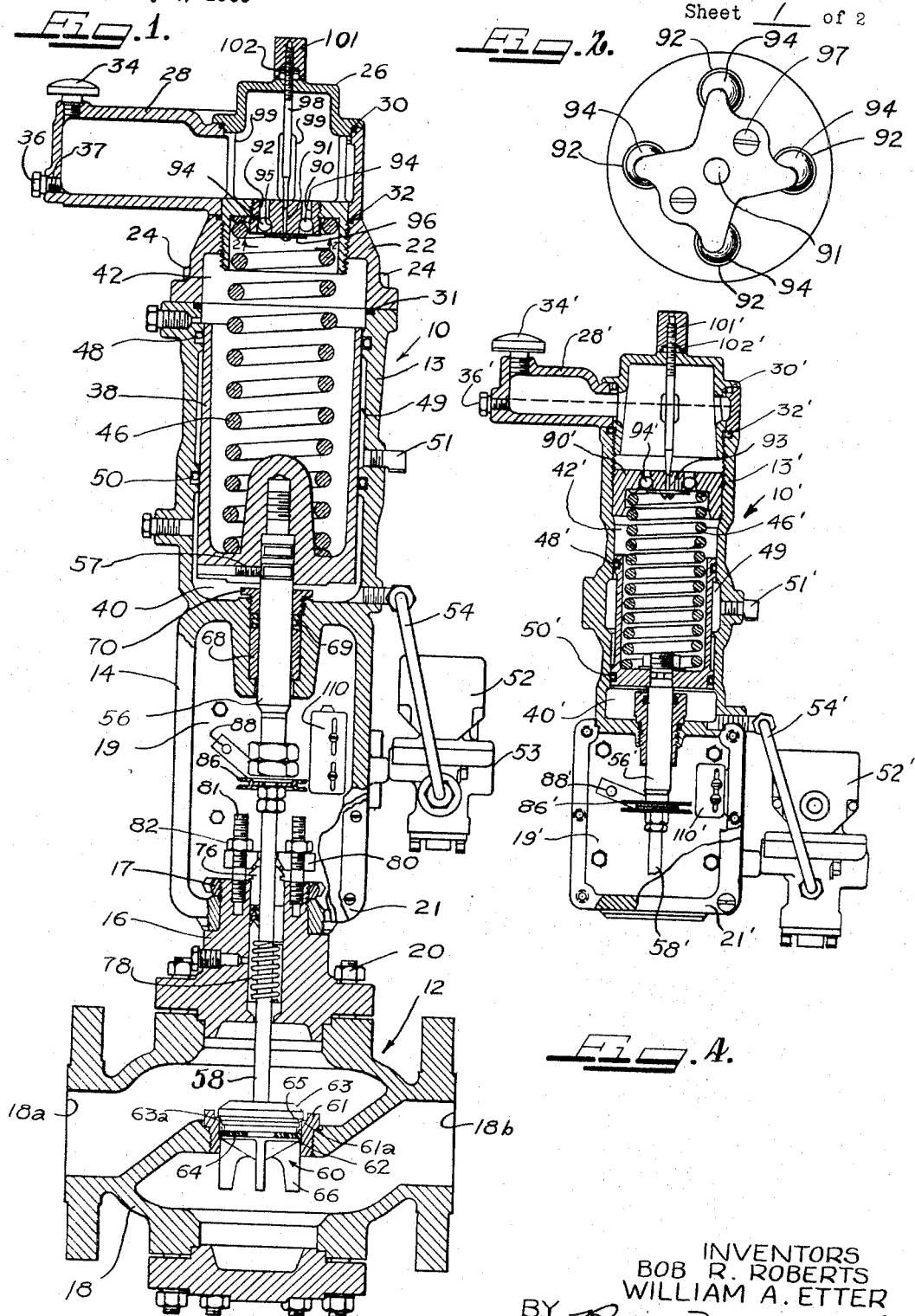

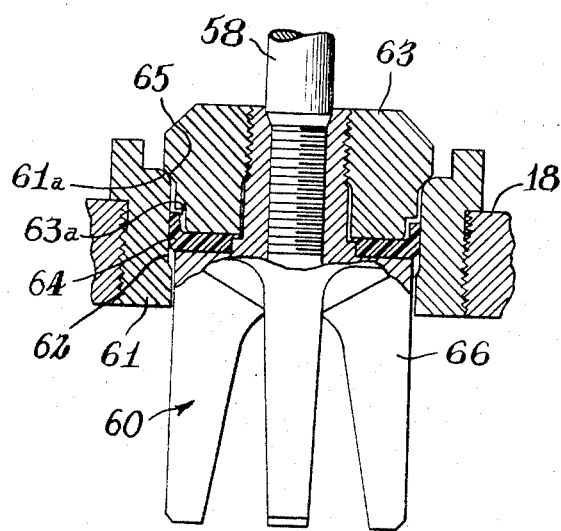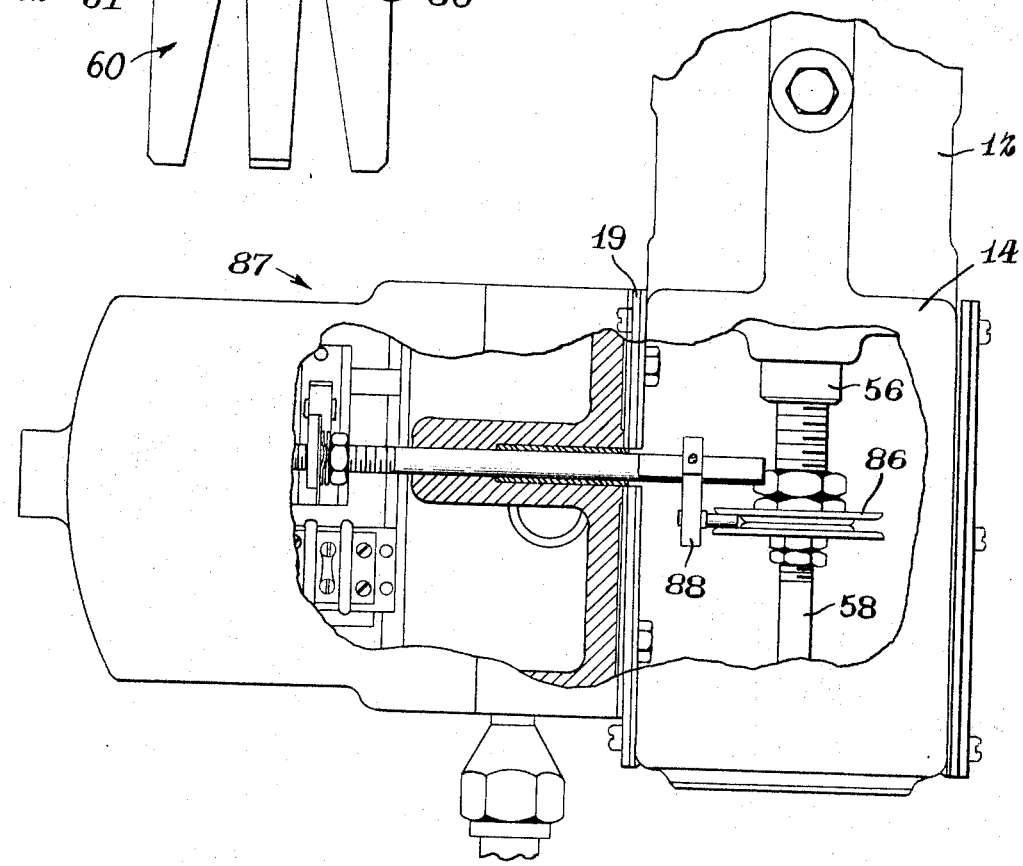

3,427,930
VALVE ACTUATOR
Bob R. Roberts and William A. Etter, Marshalltown, Iowa, assignors to Fisher Governor Company, a corporation of Iowa
Filed July 2, 1965, Ser. No. 469,171
U.S. Cl. 92—12
Int. Cl. F15b *15/14, 21/00;* F16k *31/143*
2 Claims

ABSTRACT OF THE DISCLOSURE

A pneumatically operated spring-return or actuated valve mechanism having a driven piston stroking speed control to permit adjustment of the speed of the piston in one direction of movement. The mechanism is provided with an elongated rotatably mounted reservoir constructed and arranged, so as to be mounted on the casing of the device either in a vertical position or a horizontal position.

---

This invention relates to an actuator mechanism and, more particularly, to an air powered piston-type actuator mechanism for valves.

The actuator mechanism is particularly adapted for use with a control valve in boiler fuel (gas or oil) lines and in steam lines to steam atomizers. The actuator includes a pneumatically operated, spring-return piston operatively connected to the control valve. The piston is controlled by a solenoid valve which supplies and exhausts the loading air pressure. Incorporated within the actuator is a hydraulic stroking speed control device to permit adjustment of the time required to open the valve. Valve closing occurs in a very short time, less than one second, due to ball check valve members in the hydraulic portion of the actuator and large exhaust passages in the solenoid valve.

One object of the present invention is to provide a piston-type actuator wherein the piston therein is movable in a first direction by pressurized fluid and in an opposite direction by a spring member, with control means within the actuator mechanism for permitting a variable control of speed in one direction of movement of the piston.

Another object of this invention is to provide a piston-type pneumatically powered actuator adapted for use with a valve mechanism, wherein pressurized air is adapted to move the piston in a first direction and spring means are provided for biasing the piston in an opposite direction, and wherein adjustable control means are provided for regulating the speed of the piston in the first direction, such control means including a barrier having an adjustable restriction therein and having bore means therein adapted to be closed by one-way ball check valves, whereby in one direction of piston movement, the fluid in the piston compartment is forced through the restriction and the one-way ball check valves are closed and wherein in the opposite direction of motion, the ball check valves are opened to permit rapid passage of fluid from a reservoir into the piston compartment.

A further object of the present invention is to provide an improved pneumatically operated spring-return, piston-actuated valve having a reservoir rotatably mounted on the actuator casing in sealing relationship therewith so as to permit support of the actuator casing in either horizontal or upright positions.

Yet another object of this invention is to provide an improved valve seating arrangement for a valve mechanism. These and other objects of the invention will be made more apparent hereafter.

The attached drawings illustrate a preferred embodiment of the present invention, in which:

FIGURE 1 is a cross-sectional view of an actuator mechanism embodying the principles of the present invention and illustrating the actuating mechanism in combination with a valve mechanism;

FIGURE 2 is a cross-sectional view taken generally along the line 2—2 of FIGURE 1;

FIGURE 3 is an elevation view of the actuator mechanism of FIGURE 1 illustrating the limit switch assembly;

FIGURE 4 is a cross-sectional view of a modified actuator mechanism embodying the principles of the present invention; and FIGURE 5 is a cross-sectional view on an enlarged scale of the valve seating arrangement.

Referring now to FIGURE 1, there is illustrated a cross-sectional view of an actuator mechanism 10 embodying the principles of the present invention, such actuator mechanism being operatively connected to a valve mechanism 12. The actuator mechanism comprises a generally hollow cylinder or casing 13 that has integrally formed therewith and depending therefrom a yoke 14. The yoke 14 is joined to a flanged adaptor 16 by means of a lock nut 17. The legs of the yoke 14 are enclosed with a gasketed metal plate 19 on one side and a gasketed plastic plate 21 on the other side. Adaptor 16 is operatively connected to the valve body 18 by suitable fastening means which, in the illustrative embodiment of the invention, comprise stud and nut means 20.

Affixed to the top of the cup-shaped casing 13 and forming a part thereof is the adaptor body 22. The adaptor body 22 is affixed to the casing 13 by means of machine screws 24.

Connected to the top of the casing 13 is a union member 26 which is threadedly connected to the adaptor 22 and which rotatably mounts a reservoir 28 between the flange 26a thereon and the top of the adaptor 22. It will be observed that the union 26 may be loosened with respect to the adaptor 22 to permit the reservoir 28 to be rotated about the longitudinal axis of the casing. This construction will provide for mounting of the casing 13 either horizontally or vertically in use. Seal means 30 and 32 are provided between engaging surfaces of the union and the reservoir to prevent leakage of fluid from within the reservoir. Seal means 31 are also provided between the casing 13 and adaptor 22. Each of the seal means 30, 31 and 32 may comprise a resilient O-ring.

A weatherproof umbrella-type vent assembly 34 is provided in the reservoir. The closure plug 36 is adapted to close an opening 37 in the reservoir and may be removed to drain oil from the reservoir 28 when desired. It will be noted that the vent assembly 34 and the closure plug 36 may be interchanged if desired to assure that the vent assembly will be at the upper part of the reservoir regardless of the actuator mounting. The vent assembly is shown in FIGURES 1 and 3 in the vertical mounting position of the actuator.

Provided within the casing 13 is a cup-shaped piston 38, which is adapted to reciprocate within the casing 13. The piston divides the large chamber provided within the casing into a first compartment 40 adapted to communicate with a source of pressurized fluid such as air, and a second compartment 42 which is adapted to be filled with a suitable fluid such as oil.

When fluid under pressure is introduced into the compartment 40, the piston moves in a first direction toward the upper end thereof. Movement of the piston is opposed by the spring member 46 disposed between union 26 and piston 38. O-ring seal means 48 and 50 are provided within the casing for sealing between the interior wall of the casing 13 and the exterior wall of piston 38 to provide a fluid-tight interconnection of parts.

The chamber 49 between the seals 48 and 50 is vented through fitting 51 to eliminate any mixing of air and hydraulic fluid or oil and also to vent any leakage to the atmosphere. If required, the fitting 51 may be connected to a conduit for piping away the vented matter.

The means for controlling the introduction of pressurized air into compartment 40 comprises a three-way momentary contact solenoid valve 52 which is operatively connected at one end to the compartment 40 by means of conduit means 54 and is operatively communicated with a source of pressurized fluid, preferably compressed air.

Suitably affixed to one end of the piston 38 and depending outwardly therefrom is an actuator stem 56. The stem 56 may be threaded into an opening in the piston and fixed in place by a set screw 57. Affixed to and forming part of the actuator stem 56 is a valve stem 58, which is connected at its lower end to the valve member 60, which is adapted to close the opening 62 defined in seat ring 61 in valve body 18 between the inlet 18a and the outlet 18b.

Another feature of this invention is the construction of the valve member 60. The valve plug has two circumferential seating surfaces that provide an overtravel in the closed position. One seat is provided by an inverted insert ring 64 made from a suitable flexible plastic material, such as Teflon, which slides into the opening 62 in seat ring 61 first and closes the opening 62. The second seat 65, formed on the periphery of the valve plug, contacts the seat ring 61 after additional travel of the valve plug 63. The second seat defines a conical surface for permitting line engagement with the convexly-shaped surface 61a on seat ring 61.

Referring to FIGURE 5, there is better seen the valve seating arrangement. The periphery of the plastic ring 64 is forced inwardly into recess 63a as ring 64 enters opening 62 upon downward movement of piston 38. A first plastic-to-metal seal is effected between the bottom surface of ring 64 and the wall in the metallic seat ring 61 that defines opening 62.

Further movement of the valve member 60 will bring the chamfered or generally conical surface 65 on the metallic valve plug 63 into line engagement with the rounded surface 61a on seat ring 61. This provides a second metal-to-metal seal.

Valve plug 63 is suitably affixed to valve part 66, as for example, by a threaded interconnection of parts, and valve stem 58 may be threadedly engaged with valve part 66.

The overtravel, which may be on the order of 3/8 inch in one presently preferred form of the invention, is important since it provides a margin within which the limit switch assembly can be properly set. Thus, the valve member will be shut off when the limit switch assembly signals that it is shut off.

The actuator stem 56 is journaled in a stem guide bushing 68 carried in the yoke portion 14 of the casing 13. Disposed adjacent to the bushing 68 is a packing 69 which is secured in place together with the stem guide bushing by means of a bushing retainer 70.

The passage of fluid from the valve body 18 about the valve stem 58 is prevented by the packing 74, which may be of the chevron type as illustrated, retained within the opening about the valve stem 58 by means of a retainer 76. The spring 78 is adapted to put pressure upon the packing 74 to maintain tight sealing relationship between the stem 58, adaptor 16 and packing 74. The retainer 76 is confined in place by means of the annular holder member 80 suitably affixed to lower adaptor 16 by means of studs 81 and nuts 82.

Operatively connected to stems 56 and 58 adjacent the union thereof is a stem disc 86. The stem disc 86 is adapted to engage the arm assembly 88, which is operatively connected to limit switch assembly 87. The switch assembly 87 is adapted to be mounted by machine screws 19a on the metal plate 19 that is connected to yoke 14 of the casing 12 (FIGURE 3). The switch assembly may be of a known type, as for example, a Fisher Governor Type 304 Limit Switch Assembly. The switch assembly can have any number of switches from one to six and these switches can be set to switch at any point in the stroke of the valve stem. The switch assembly is suited for sequencing operation in the lighting of and securing of boilers. In sequencing, the signal from a limit switch is utilized to actuate the solenoid valve of a second actuator and so on, until the boiler is on or off the line.

It is a feature of the invention to provide means in the casing for adjusting the speed of the piston 38 in a valve opening direction. Such means include a restriction block or barrier 90 having a restriction 91 of relatively small size extending therethrough and relatively large bore means extending therethrough which comprise a plurality of bores 92. The restriction block 90 is adapted to be suitably connected to the union 26, as for example, by threading the two parts together. The bores 92 are adapted to be closed by ball valve members 94 that are retained in place in the bores 92 by means of a ball retainer 96. The check valve members 94 may be made from nylon or like material.

The flow of fluid through the restriction 91 may be regulated by adjusting the position of the needle valve 98 with respect to the restriction 91. Needle valve 98 may be adjusted by removing closing cap 101, loosening jam nut 102 and rotating the needle valve 98 to selected adjusted position. Jam nut 102 is then tightened to secure the needle valve in place.

The reservoir 28 communicates with compartment 42 through the openings 99 in union 26 and through either the restriction 91 or the bores 92 in the barrier 90. As best seen in FIGURE 4, there is a small hole 93 in barrier 90 that communicates with the reservoir 28 and the chamber 42 above piston 38. Hole 93 allows some flow of hydraulic fluid even if needle valve 98 were shut off tightly. Such hole is also included in the device shown in FIGURE 1, but has been omitted from FIGURE 1 in order to more clearly show the barrier and check valves therein.

Referring to FIGURE 2, there is illustrated a detail view of the means for regulating the speed of piston travel. It is seen that in a presently preferred form of the invention, four bores 92 are provided in the restriction block or barrier 90. In each of the bores, there is provided a ball 94 that is adapted to seat against a shoulder 95 in the bore to close the flow of fluid therethrough. The ball retainer 96, which is provided to retain the balls adjacent to the valve seats, is secured to the barrier by means of machine screws 97. The retainer 96 is provided with arms 96a that protrude from the central part of the retainer to retain the balls in passages 92 with as small a restriction in the flow passage as practical. Opening 96b in retainer 96 permits communication of restriction 91 with chamber 42.

In one presently preferred form of the invention, the piston 38 within the actuator mechanism is loaded by a three-way momentary contact solenoid valve 52 operative in response to an electrical pulse signal to permit flow of pressurized air into compartment 40 to stroke the actuator and the main valve member carried therewith to its open position and another momentary electrical pulse signal will actuate the solenoid valve 52 to stroke the valve member or main valve to its closed position. The actuator may be adjusted with an adjustable speed control so that the opening speed of the piston 38 can be varied from five seconds to one minute. The downward or valve closing speed is nonadjustable and very rapid, closing in less than one second.

To operate the actuator, one coil of the solenoid valve 52 is energized to allow a source of pressurized fluid, for example 100 pounds p.s.i. supply air, into the lower cylinder chamber or first compartment 40. The increased pressure within the compartment 40 will urge the piston 38 upward as seen in FIGURE 1, but since the compartment 42 is filled with fluid, such as oil, the upward motion is restricted. At the first increment of piston motion, the four ball valves 94 seat against the shoulders or valve seats 95 in bores 92, thereby closing bores 92 to fluid flow and permitting oil to flow out of upper piston chamber 42 primarily through the restriction 91. By adjusting the size of the opening of the restriction 91, that is, by adjusting the position of the needle member 98 with respect to the restriction 91, the speed of piston travel in a valve opening direction can be varied. In one form of the invention, the opening stroke or the speed of piston travel in a valve opening direction can be varied from five seconds to one minute. When the valve member 98 is screwed in, the flow of hydraulic fluid is restricted further and the stroking speed will be slower. As the needle valve is backed off, the stroking speed becomes faster.

When the solenoid valve 52 is actuated so as to allow the air pressure to be discharged from the lower piston chamber 40 to atmosphere, the spring 46 will overcome the pressure in compartment 40 and force the piston 38 downwardly. At this time, the ball check valves 94 will move downwardly against the ball retainer 96 to open the bores 92 for free flow of oil from the reservoir 28 into compartment or chamber 42. Since the flow of oil from the reservoir into chamber 42 is substantially unrestricted and further because of the large solenoid exhaust port 53 which permits rapid unloading of supply pressure from chamber 40, the valve closing will occur in a very short time, less than one second.

Travel indicator 110 is furnished to show the open and closed positions of valve 60.

It is seen that the reservoir 28 defines a chamber or overflow reservoir that is elongated to one side of the axis of the actuator and is adapted to receive the oil that is forced from chamber 42 when the piston 38 moves upwardly or toward the reservoir on end of casing 13. The reservoir is vented to the atmosphere through the weatherproof vent assembly 34. Vent assembly 34 may be connected as shown in FIGURES 1 and 3 for vertical mounting of the actuator. For horizontal mounting of the actuator, vent assembly 34 and closure cap 36 may be interchanged. The novel shape of the reservoir 28 and the fact that it is rotatable enable the mounting of the actuator in either the vertical or horizontal positions.

In FIGURE 4, there is illustrated a modified form of the invention, differing essentially from the form of the invention shown in FIGURE 1 in that the piston has a relatively smaller effective area. The corresponding elements in FIGURE 4 are identified by primed numerals and further explanation of the embodiment therein illustrated is believed unnecessary.

There has been provided by the present invention an improved actuator mechanism that includes a pneumatically-operated, spring-return piston, movement of which is controlled by a solenoid valve that supplies and exhausts loading air pressure. Hydraulic stroke speed means are provided to adjust the movement of the piston in one direction. Movement of the piston in the opposite direction is rapid due to ball check valves in the hydraulic circuit of the actuator mechanism between the hydraulic fluid reservoir and the hydraulic fluid piston chamber. Rapid movement of the piston in said opposite direction is also enhanced by large exhaust passages in the solenoid valve. The hydraulic fluid reservoir is uniquely mounted on the actuator casing so as to accommodate vertical or horizontal positioning of the actuator mechanism and operator, such as a valve, associated therewith.

There has further been provided a unique control valve that includes two seating surfaces for providing an overtravel as the valve closes—a first plastic seating surface for engaging the seat ring and a second metal portion for providing metal-to-metal valve closure. Such overtravel insures that the valve will be shut off when the limit switch signals that it is shut off.

While there has been shown and described a particular embodiment of this invention, it will be obvious to those skilled in the art that various changes and modifications may be made therein without departing from the invention. Therefore, it is intended in the appended claims to cover all such changes and modifications as fall within the true spirit and scope of the invention.

We claim:

1. An actuator for use with a valve mechanism comprising a tubular casing, a piston reciprocably movable in said casing, and dividing the interior thereof into a first compartment adapted to be communicated to a source of fluid pressure and a second compartment substantially filled with liquid, an actuator stem operatively connected at one end to said piston for movement therewith and adapted to be connected at its other end to a valve member, means for controlling the pressure in said first compartment to move the piston in a first direction, spring means for biasing the piston in a second and opposite direction, means for controlling the speed of piston travel constructed and arranged to provide restricted speed of movement of said piston in said first direction and unrestricted speed of movement of said piston in said second direction, said controlling means comprising a block having a relatively small restriction and a relatively large bore means therethrough; a reservoir mounted on said casing communicating with said second compartment through said controlling means, valve means in said bore means for opening said bore means to permit unrestricted flow of liquid through said bore means when said piston moves in said second direction and for closing said bore means when said piston moves in said first direction so as to return liquid to said reservoir from said second compartment through said restriction; said valve means comprising ball means movable in said bore means and retained in place in said bore means by retaining means, an adjustable member for selectively regulating the flow of liquid through said restriction to control the speed of the piston in said first direction, said reservoir being elongated to one side of the axis of the actuator, and means mounting said reservoir for rotation on said casing for movement about the longitudinal axis of the casing for enabling mounting of said casing either in a horizontal position or a vertical position, said mounting means including seal means provided between the reservoir and casing for preventing leakage of liquid from the reservoir.

2. An actuator as in claim 1, including spaced seal means between said piston and casing, which cooperate with the casing and piston side wall to define a chamber and vent means in the casing communicating with the chamber for venting fluid or liquid leakage entering the chamber.

References Cited

UNITED STATES PATENTS

| 192,924 | 7/1877 | Luster | 137—512.1 X |
|---|---|---|---|
| 2,469,038 | 5/1949 | Winkler | 92—12 X |
| 2,580,433 | 1/1952 | Kain | 251—54 X |
| 2,922,432 | 1/1960 | Huntington et al. | 137—513.7 X |
| 3,064,675 | 11/1962 | Johnson et al. | 251—54 X |
| 3,289,694 | 12/1966 | Frye | 137—513.7 X |

FOREIGN PATENTS 198,476   3/1922   Great Britain.

MARTIN P. SCHWADRON, Primary Examiner.

IRWIN CHARLES COHEN, Assistant Examiner.

U.S. Cl. X.R.

92—82; 251—54, 63.5